United States Patent
Itoh et al.

(12) 
(10) Patent No.: US 6,599,981 B2
(45) Date of Patent: Jul. 29, 2003

(54) METHOD FOR MANUFACTURING OLEFINIC THERMOPLASTIC ELASTOMER COMPOSITION

(75) Inventors: Yuichi Itoh, Chiba (JP); Akira Uchiyama, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/988,058

(22) Filed: Nov. 16, 2001

(65) Prior Publication Data

US 2002/0091198 A1 Jul. 11, 2002

(30) Foreign Application Priority Data

Nov. 17, 2000 (JP) .......................... 2000-350873

(51) Int. Cl.⁷ .................. C08L 27/04; C08L 27/12; C08L 33/14; C08L 37/00; C08L 41/00
(52) U.S. Cl. .................. 525/191; 525/199; 525/206; 525/209; 525/214; 525/232; 525/238; 525/240; 525/241; 422/131; 422/134; 422/135; 422/136; 422/137; 422/138
(58) Field of Search .................. 525/191, 232, 525/240, 241, 199, 214, 206, 207, 238; 422/131, 134, 135, 136, 137, 138

(56) References Cited

U.S. PATENT DOCUMENTS

| | | |
|---|---|---|
| 4,454,092 A | 6/1984 | Shimizu et al. |
| 4,824,256 A | 4/1989 | Haring et al. |

FOREIGN PATENT DOCUMENTS

| | | |
|---|---|---|
| EP | 0 769 361 | 4/1997 |
| EP | 1 033 226 | 9/2000 |
| EP | 1 050 548 | 11/2000 |
| JP | 8-267539 | 10/1996 |
| WO | WO 00/20188 | 4/2000 |

*Primary Examiner*—Nathan M. Nutter
(74) *Attorney, Agent, or Firm*—Birch, Stewart, Kolasch & Birch, LLP (57) ABSTRACT

This invention relates to a method for manufacturing an olefinic thermoplastic elastomer composition, characterized by disposing specific kneading segment at least at one place of the screw on the occasion of manufacturing an olefinic thermoplastic elastomer composition comprising a polyolefin resin and a crosslinked rubber by dynamic crosslinking with a twin screw extruder.

17 Claims, 4 Drawing Sheets

FIG. 4

METHOD FOR MANUFACTURING OLEFINIC THERMOPLASTIC ELASTOMER COMPOSITION

BACKGROUND OF THE INVENTION

The present invention relates to a method for manufacturing an olefinic thermoplastic elastomer composition having excellent tensile properties and appearance when molded into a product.

An olefinic thermoplastic elastomer, being light and easy for recycling, is widely used for automobile parts, industrial machine parts, electronic/electric instrument parts, construction materials and the like as an energy-saving and resource-saving thermoplastic elastomer particularly as an alternate to a soft polyvinyl chloride and a vulcanized rubber.

A conventional olefinic thermoplastic elastomer, however, has the defect that it has poor tensile strength compared to a soft polyvinyl chloride and a vulcanized rubber, and improving this defect has been strongly desired.

Further, particularly in the case of forming into a sheet and extrusion forming into a profile, the appearance of the molded product is very important. Inferior appearance due to roughness, minute projections and so forth on the surface of the molded product damages the value of the product remarkably. JP-A-58-25340 proposes a technique for manufacturing an olefinic thermoplastic elastomer by a dynamic crosslinking method with a twin screw extruder. Although this method produces sheets or extrusion moldings with sharply improved appearance compared to ones manufactured with a single screw extruder, it is not necessarily satisfactory. The reason considered therefor is that kneading at high shearing velocity in a twin screw extruder generates much heat by shearing, whereby the crosslinking reaction proceeds rapidly to result in a tendency to lead to non-uniform crosslinking.

JP-A-9-95540 describes a manufacturing method with a screw composed of specific kneading discs. But, this method is apt to cause the above-mentioned poor appearance when the screw revolution is raised and the extrusion throughput per hour is increased in order to increase productivity.

The inventors earnestly studied to solve the above problem and have found that, in manufacturing an olefinic thermoplastic elastomer by dynamically crosslinking a polyolefin resin and a rubber component using a twin screw extruder, the use of a screw having specific kneading segment allows a reduction in shear-derived heat generation, and that an olefinic thermoplastic elastomer composition excellent in tensile strength and molding appearance can be obtained by performing the dynamic crosslinking at an appropriate rate. Further, the inventors have found, on the occasion of manufacturing an olefinic thermoplastic elastomer by dynamically crosslinking a polyolefin resin and a rubber component using a twin screw extruder, by performing the dynamic crosslinking under the specific conditions, emergence of fish eyes (gel-like minute mass) decreases remarkably, and thus the inventors have completed the present invention.

OBJECTS AND SUMMARY OF THE INVENTION

The present invention intends to solve the problem as mentioned above in the prior art, and the object is to provide a method that can produce with good productivity an olefinic thermoplastic elastomer composition superior in tensile strength and molding appearance, as well as a method that can produce an olefinic thermoplastic elastomer composition wherein emergence of fish eyes (gel-like minute mass) is decreased markedly.

The present invention comprises the following inventions.

(i) A method for manufacturing an olefinic thermoplastic elastomer composition characterized in that, in manufacturing an olefinic thermoplastic elastomer composition comprising a polyolefin resin and a crosslinked rubber by dynamic crosslinking with a twin screw extruder, there is used a screw where at least one kneading segment (α) is disposed, and the clearance between the vertex portion of the kneading segment (α) (here, the vertex portion means a point or portion at the farthest distance from the center of gravity in the cross-section) and the cylinder inner wall of the extruder is 1/60 or more to 1/6 or less of the screw diameter.

(ii) A manufacturing method according to the above (i), wherein a kneading segment (β) is disposed downstream the kneading segment (α), which segment (β) has a ratio of the clearance between the vertex portion of the kneading segment (here, the vertex portion means a point or portion at the farthest distance from the center of gravity in the cross-section) and the cylinder inner wall of the extruder to the screw diameter which ratio is smaller than the ratio as set forth regarding the kneading segment (α).

(iii) A manufacturing method according to the above (ii), wherein the kneading segment (α) and the kneading segment (β) are adjacently disposed.

(iv) A manufacturing method according to any one of the above (i) to (iii), wherein the clearance between the vertex portion of the kneading segment (α) (here, the vertex portion means a point or portion at the farthest distance from the center of gravity in the cross-section) and the cylinder inner wall of the extruder is 1/60 or more to 1/10 or less of the screw diameter.

(v) A manufacturing method according to the above (ii) or (iii), wherein the value is less than 1/60, which value is a ratio of the clearance between the vertex portion of the kneading segment (β) (here, the vertex portion means a point or portion at the farthest distance from the center of gravity in the cross-section) and the cylinder inner wall of the extruder to the screw diameter.

(vi) A manufacturing method according to any one of the above (i) to (v), wherein the kneading segment (α) has the following features:

A1) the kneading segment having three vertex portions (a) in the cross-section (herein, the vertex portion means a point or portion at the farthest distance from the center of gravity in the cross-section), A2) the vertex portion of the kneading segment being composed of a portion (a1) continuously twisted to the contrary direction relative to the screw rotary direction and a portion (a2) continuously twisted to the same direction relative to the screw rotary direction, respectively to the thickness direction, and A3) the thickness of the kneading segment (the total of the thickness of a1 and that of a2) being 1.0 times or more of the screw diameter.

(vii) A method for manufacturing an olefinic thermoplastic elastomer composition characterized in that, in manufacturing an olefinic thermoplastic elastomer composition comprising a polyolefin resin and a crosslinked rubber by dynamic crosslinking with a twin screw extruder, a kneading segment (A) is disposed at least at one place of the screw, which segment (A) has the following features:

A1) the kneading segment having three vertex portions (a) in the cross-section (here, the vertex portion means a point or portion at the farthest distance from the center of gravity in the cross-section), A2) the vertex portion of the kneading segment being composed of a portion (a1) continuously twisted to the contrary direction relative to the screw rotary direction and a portion (a2) continuously twisted to the same direction relative to the screw rotary direction, respectively to the thickness direction, and A3) the thickness of the kneading segment (the total of the thickness of a1 and that of a2) being 1.0 times or more of the screw diameter.

(viii) A manufacturing method according to the above (vii), wherein there is used a screw disposed with the kneading segment (A) at least at one place and disposed with a kneading segment (B) at least at one place having the following features:

B1) the kneading segment having two vertex portions (b) in the cross-section (here, the vertex portion means a point or portion at the farthest distance from the center of gravity in the cross-section), and B2) the vertex portion of the kneading segment having a structure twisted discontinuously to the thickness direction.

(ix) A manufacturing method according to the above (viii), wherein there is used a screw that has a structure disposed with the kneading segment (B) on the downstream side of the kneading segment (A) with no other segment between.

(x) A manufacturing method according to the above (ix), wherein there is used a screw that is disposed with a combination of the kneading segments (A) and (B) at least at two places, in which combination the kneading segment (B) is disposed on the downstream side of the kneading segment (A) with no other segment between.

(xi) A manufacturing method according to any one of the above (vii) to (x), wherein the clearance between the vertex portion of the kneading segment (A) and the inner wall of the extruder cylinder is 1/100 or more to 1/6 or less of the screw diameter.

(xii) A manufacturing method according to any one of the above (viii) to (x), wherein the value is less than 1/60, which value is a ratio of the clearance between the vertex portion of the kneading segment (B) (here, the vertex portion means a point or portion at the farthest distance from the center of gravity in the cross-section) and the inner wall of the extruder cylinder to the screw diameter.

(xiii) A manufacturing method according to any one of the above (i) to (xii), wherein at least one of the upstream barrel of the twin screw extruder is set to a temperature of 170° C. or lower and at least one of the downstream barrel is set to a temperature of 190° C. or higher.

(xiv) A manufacturing method according to any one of the above (i) to (xiii), wherein the dynamic crosslinking is conducted under the conditions satisfying the following expression:

$$4.5 < 2.2 \log X + \log Y - \log Z + (T-180) \div 100 < 6.0$$

wherein T is a resin temperature (°C.) at the die outlet of the twin screw extruder, X is a screw diameter (mm) of the extruder, Y is a maximum shearing velocity (sec$^{-1}$) generated at the part of the kneading segment (A) in the extruder and Z is an extrusion throughput (kg/h) of the extruder, and the maximum shearing velocity Y (sec$^{-1}$) is determined from the equation $$Y = (X \times \pi \times S)/U$$

wherein X is a screw diameter (mm) of the twin screw extruder, S is a number of screw revolution per second (rps) and U is a distance (mm) of the narrowest portion of the clearance between the barrel inner wall and the kneading segment of the screw.

(xv) A method for manufacturing an olefinic thermoplastic elastomer composition characterized in that, in manufacturing an olefinic thermoplastic elastomer composition comprising a polyolefin resin and a crosslinked rubber by dynamic crosslinking with a twin screw extruder, the crosslinking is conducted under the conditions satisfying the following expression:

$$Z/X^{2.3} \geq 0.01$$

wherein Z is a throughput (kg/h) of the twin screw extruder at a steady-state and X is a screw diameter (mm) of the twin screw extruder, and besides the olefinic thermoplastic elastomer composition has an average number of fish eyes of 10 or less determined on at least three or more samples taken every one hour at a steady-state.

Hereunder, the method for manufacturing the olefinic thermoplastic elastomer composition of the present invention is explained.

The first invention of the present application relates to a method for manufacturing an olefinic thermoplastic elastomer composition, wherein, on the occasion of producing an olefinic thermoplastic elastomer composition comprising a polyolefin resin and a crosslinked rubber through dynamic crosslinking with a twin screw extruder, there is used a screw disposed with at least one kneading segment (α), and the clearance between the vertex portion of the kneading segment (α) (here, the vertex portion means a point or portion at the farthest distance from the center of gravity in the cross-section) and the cylinder inner wall of the extruder is 1/60 or more to 1/6 or less of the screw diameter.

The second invention of the present application relates to a method for manufacturing an olefinic thermoplastic elastomer composition, wherein, at the time of producing an olefinic thermoplastic elastomer composition comprising a polyolefin resin and a crosslinked rubber through dynamic crosslinking with a twin screw extruder, there is disposed at least at one place of the screw a kneading segment (A) having the following features:

A1) the kneading segment having three vertex portions (a) in the cross-section (here, the vertex portion means a point or portion at the farthest distance from the center of gravity in the cross-section), A2) the vertex portion of the kneading segment being composed of a portion (a1) continuously twisted to the contrary direction relative to the screw rotary direction and a portion (a2) continuously twisted to the same direction relative to the screw rotary direction, respectively to the thickness direction, and A3) the thickness of the kneading segment (the total of the thickness of a1 and that of a2) being 1.0 times or more of the screw diameter.

Both the first invention and the second invention of the present application are characterized by dynamically crosslinking a polyolefin resin and a rubber component with a twin screw extruder having specific kneading segments.

The third invention of the present application relates to a method for manufacturing an olefinic thermoplastic elastomer composition, wherein, in producing an olefinic thermoplastic elastomer composition comprising a polyolefin resin and a crosslinked rubber through dynamic crosslinking with a twin screw extruder, there is conducted the crosslinking under the conditions satisfying the following expression:

$$Z/X^{2.3} \geq 0.01$$

wherein Z is a throughput (kg/h) of the twin screw extruder at a steady-state and X is a diameter (mm) of the screw of the extruder, and there is obtained an olefinic thermoplastic elastomer composition having an average of fish eyes of 10 or less determined on at least three or more samples taken every one hour at a steady-state.

First, the components constituting the olefinic thermoplastic elastomer composition are explained.

Polyolefin Resin

The polyolefin resin used in the present invention consists of a high molecular weight solid product obtained by polymerizing one or more monoolefin by either a high pressure method or by a low pressure method. As such a resin there are enumerated, for example, isotactic and syndiotactic monoolefin-based polymer resins. Resins representative of these are commercially available.

As raw material olefins suitable for the polyolefin resin, there are enumerated, for example, ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins are used alone or in a mixture of two or more.

Any polymerization mode, regardless of random or block mode, can be adopted as long as it produces resinous substances. These polyolefin resins can be used singly or in a combination of two or more.

Among these polyolefin resins, particularly preferred are propylene-based polymers, such as propylene homopolymer, propylene-ethylene block copolymer, propylene-ethylene random copolymer and propylene-ethylene-butene random copolymer.

The polyolefin resin used in the present invention preferably has a MFR (ASTM D-1238-65T, 230° C., load 2.16 kg) in the range of 0.01 to 100 g/10 min., and more preferably 0.05 to 50 g/10 min.

The above polyolefin resin has a role of improving the flow and heat resistance of the composition.

In the present invention, the polyolefin resin is used in a ratio of preferably 10 to 80 parts by weight, more preferably 15 to 60 parts by weight based on the total 100 parts by weight of the polyolefin resin and crosslinked rubber. Using the polyolefin resin in the above-mentioned ratio provides a high heat resistant thermoplastic elastomer composition excellent in moldability as well as excellent in flexibility and rubbery elasticity.

Crosslinked Rubber

As the crosslinked rubber used in the present invention, there is enumerated, for example, at least one rubber selected from the group consisting of ethylene-α-olefin-non-conjugated polyene copolymer rubber, ethylene-α-olefin copolymer rubber, isoprene rubber and hydrogenated product thereof, butadiene rubber and hydrogenated product thereof, styrene-butadiene rubber and hydrogenated product thereof, styrene-isoprene rubber and hydrogenated product thereof, chloroprene rubber, butyl rubber, halogenated butyl rubber, polyisobutylene rubber, acrylonitrile-butadiene rubber, chlorinated polyethylene rubber, fluorine rubber, silicone rubber, polysulfide rubber and urethane rubber. Among these, the ethylene-α-olefin-non-conjugated polyene copolymer rubber and ethylene-a-olefin copolymer rubber are preferable, and the ethylene-propylene-non-conjugated diene copolymer rubber having the following characteristics is particularly preferable:

ethylene/propylene (molar ratio): 30/70 to 90/10 iodine value: 1 to 30 (g/100 g)

Mooney viscosity $ML_{1+4}$(100° C.) 15 to 250

In the present invention, the crosslinked rubber is used in a ratio of preferably 20 to 90 parts by weight, more preferably 40 to 85 parts by weight based on the total 100 parts by weight of the polyolefin resin and crosslinked rubber.

Other Components

For the olefinic thermoplastic elastomer composition of the present invention, in addition to the polyolefin resin and crosslinked rubber, a softening agent and/or an inorganic filler can be incorporated.

The softening agents may be any of those usually used for rubbers. Illustrative examples thereof include petroleum softening agents, such as process oil, lubricating oil, paraffin oil, liquid paraffin, petroleum asphalt and vaseline; coal tars, such as coal tar and coal tar pitch; fatty oils, such as castor oil, linseed oil, rape oil, soybean oil and coconut oil; tall oil; waxes, such as beeswax, carnauba wax and lanolin; fatty acids and metal salts thereof, such as ricinolic acid, palmitic acid, stearic acid, barium stearate, calcium stearate and zinc laurate; synthetic polymeric substances, such as terpene resin, petroleum resin, coumarone-indene resin and atactic polypropylene; ester softening agents, such as dioctyl phthalate, dioctyl adipate and dioctyl sebacate; microcrystalline wax; rubber substitute(factice); liquid polybutadiene; modified liquid polybutadiene; liquid Thiokol™; and hydrocarbon based synthetic lubricating oils.

In the present invention, the softening agent is used, from the viewpoint of the heat resistance of the obtained thermoplastic elastomer composition, usually in a ratio of 150 or less parts by weight, preferably 2 to 100 parts by weight, more preferably 5 to 80 parts by weight to the total 100 parts by weight of the polyolefin resin and crosslinked rubber. When the softening agent is used in the ratio mentioned above, the obtained thermoplastic elastomer composition is excellent in flow property during molding without lowering the mechanical properties of molded products.

In the present invention, the softening agent may be added at the time of manufacturing the olefinic thermoplastic elastomer or may be oil extended in the raw material rubber beforehand.

The inorganic filler includes, for example, calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass balloon, shirasu balloon, basic magnesium sulfate whisker, calcium titanate whisker and aluminum borate whisker.

In the present invention, the inorganic filler is used, from the viewpoint of rubbery elasticity and moldability of the obtained thermoplastic elastomer composition, usually in a ratio of 100 or less parts by weight, preferably 2 to 50 parts by weight to the total 100 parts by weight of the polyolefin resin and crosslinked rubber.

Further, in the present invention, the olefinic thermoplastic elastomer composition can contain heretofore known heat stabilizers, age resistors, weather resisting agents, antistatic agents and lubricants such as metal soap and wax in such an extent not to damage the object of the present invention.

In the present invention, the olefinic thermoplastic elastomer composition is obtained by blending the above-mentioned polyolefin resin, crosslinked rubber as raw material rubber and optionally incorporated softening agent and/or inorganic filler, and thereafter by dynamically crosslinking in the presence of a crosslinking agent. Here, "dynamically crosslinking" means to effect crosslinking reaction by kneading in a molten state in the presence of a crosslinking agent.

The crosslinking agent used in the present invention includes crosslinking agents generally used in thermosetting type rubbers, such as organic peroxide, phenol resin, sulfur, hydrosilicone compound, amino resin, quinone and its derivatives, amine compound, azo compound, epoxy compound and isocyanate. Of these crosslinking agents, organic peroxides are particularly preferable.

As the organic peroxide used in the present invention, there are enumerated, for example, dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropylcarbonate, diacetyl peroxide, lauroyl peroxide and tert-butyl cumyl peroxide.

Of these, in the viewpoint of odor and scorch stability preferred are 2,5-dimethyl-2,5-di-(tert-butylperoxy)hexane, 2,5-dimethyl-2,5-di-(tert-butylperoxy)hexyne-3 and 1,3-bis (tert-butylperoxyisopropyl)benzene. Among these, 2,5-dimethyl-2,5-di-(tert-butylperoxy)hexane is most preferable.

The organic peroxide is used usually in an amount to make 0.02 to 3 parts by weight, preferably 0.05 to 1 part by weight to the total 100 parts by weight of the polyolefin resin and crosslinked rubber, from the standpoints of heat resistance, tensile properties, elastic recovery, impact resilience and moldability of the obtained olefinic thermoplastic elastomer composition.

In the present invention, upon crosslinking treatment by the organic peroxides, there can be incorporated crosslinking aids such as sulfur, p-quinone dioxime, p,p'-dibenzoylquinone dioxime, N-methyl-N-4-dinitrosoaniline, nitrosobenzene, diphenylguanidine, trimethylolpropane, N,N'-m-phenylene bismaleimide, divinylbenzene and triallyl cyanurate, or polyfunctional methacrylate monomers such as ethylene glycol dimethacrylate, diethylene glycol dimethacrylate, polyethylene glycol dimethacrylate, trimethylolpropane trimethacrylate and allyl methacrylate, or polyfunctional vinyl monomers such as vinyl butyrate and vinyl stearate.

By using the above compounds, a uniform and mild crosslinking reaction can be expected. Particularly, in the present invention, divinylbenzene is most preferable. Divinylbenzene, being easy to handle, being good in compatibility with the polyolefin resin and the rubber component such as ethylene-α-olefin-non-conjugated polyene copolymer rubber which constitute the main component of the mass to be crosslinked, and since it has a function of solubilizing organic peroxides to work as dispersant thereof, produces the effect that the crosslinking by heat treatment is uniform resulting in a thermoplastic elastomer composition balanced in flow and physical properties.

The compound such as the above crosslinking aid or polyfunctional vinyl monomer is employed to make usually 2 parts by weight or less, preferably 0.2 to 1 parts by weight against the total 100 parts by weight of the polyolefin resin and crosslinked rubber.

Further, in order to accelerate the decomposition of the organic peroxide, decomposition accelerators can be used, for example, tertiary amines such as triethylamine, tributylamine and 2,4,6-tri(dimethylamino)phenol, and naphthenates of aluminum, cobalt, vanadium, copper, calcium, zirconium, manganese, magnesium, lead and mercury.

The dynamic crosslinking (heat treatment) in the first and second inventions of the present application is carried out in a twin screw extruder having specific kneading segments. The dynamic crosslinking is preferably conducted in an inert gas atmosphere of nitrogen and carbon dioxide. The temperature of the extruder is in the range from the melting point or softening point of the polyolefin resin to 300° C., usually 100 to 250° C., favorably 140 to 225° C.

In the first invention of the application, in the point of optimizing the kneading conditions and the reaction rate of the dynamic crosslinking, the clearance between the vertex portion of the kneading segment (α) (here, the vertex portion means a point or portion at the farthest distance from the center of gravity in the cross-section) and the cylinder inner wall of the extruder is 1/60 or more, preferably 2/100 or more of the screw diameter, and 1/6 or less, preferably 1/10 or less, more preferably 7/100 or less of the screw diameter. That is, it is requisite for the above clearance to be 1/60 or more to 1/6 or less of the screw diameter, and, for example, it is preferably 1/60 or more to 1/10 or less, more preferably 2/100 or more to 7/100 or less.

Further, in the first invention of the application, in the point of performing effective kneading, it is preferable to dispose a kneading segment (β) downstream the kneading segment (α) which segment (β) has a ratio of the clearance between the vertex portion of the kneading segment (here, the vertex portion means a point or portion at the farthest distance from the gravity center in the cross-section) and the cylinder inner wall of the extruder to the screw diameter which ratio is smaller than the ratio as set forth regarding the kneading segment (α).

In the first and second inventions of the application, in the point of optimizing the reaction rate of the dynamic crosslinking, it is preferable to set the temperature of at least one of upstream barrels to 170° C. or below and the temperature of at least one of downstream barrels to 190° C. or above. As used herein, the upstream means the side nearer to the feeding hopper from the intermediate point and the downstream means the side nearer to the die from the intermediate point.

The kneading time is usually 1 to 20 minutes, preferably 1 to 10 minutes. The shearing force applied is in the range of 10 to 10,000 $sec^{-1}$, preferably 100 to 2,000 $sec^{-1}$, more preferably 200 to 1,000 $sec^{-1}$ in terms of shearing velocity applied to the specific kneading segment (α) or (A), and in the range of 100 to 50,000 $sec^{-1}$, preferably 200 to 10,000 $sec^{-1}$, more preferably 500 to 5,000 $sec^{-1}$ in terms of shearing velocity applied to the specific kneading segment (β) or (B).

The dynamic crosslinking is preferably conducted under the conditions satisfying the following expression:

$$4.5 < 2.2 \log X + \log Y - \log Z + (T-180) \div 100 < 6.0$$

wherein T is a resin temperature (° C.) at the die outlet of the twin screw extruder, X is a screw diameter (mm) of the extruder, Y is a maximum shearing velocity ($sec^{-1}$) generated at the part of the kneading segment (A) in the extruder and Z is an extrusion throughput (kg/h) of the extruder, and the maximum shearing velocity Y (sec$^{-1}$) is determined from the equation $$Y=(X \times \pi \times S)/U$$

wherein X is a screw diameter (mm) of the twin screw extruder, S is a screw revolution number per second (rps) and U is a distance (mm) at the narrowest portion of the clearance between the barrel inner wall and kneading segment of the screw.

By conducting the dynamic crosslinking under the conditions satisfying the above expression, an elastomer composition can be produced which is superior in compatibility as to each component constituting the olefinic thermoplastic elastomer composition and superior in tensile strength and appearance of molded product.

The twin screw extruder usable for the present invention can be any one wherein the rotary directions of the two screws are the same or different, or wherein the two screws are completely engaged each other, partially engaged or not engaged. Among these, particularly preferred is one wherein the screw rotary directions are the same and the two screws are completely or partially engaged. In the twin screw extruder used in the present invention, the ratio of the screw length (L) to the screw diameter (D), ratio L/D, is usually 25 to 70, preferably 30 to 65, more preferably 35 to 60.

In the following the kneading segment used in the present invention is explained.

Kneading Segment ($\alpha$)

The kneading segment ($\alpha$) used in the first invention of the application is preferably one that has the same features (hereunder stated) as those of the kneading segment (A) used in the second invention of the application:

A1) the kneading segment having three vertex portions (a) in the cross-section (here, the vertex portion means a point or portion at the farthest distance from the center of gravity in the cross-section), A2) the vertex portion of the kneading segment being composed of a portion (a1) continuously twisted to the contrary direction relative to the screw rotary direction and a portion (a2) continuously twisted to the same direction relative to the screw rotary direction, respectively to the thickness direction, and A3) the thickness of the kneading segment (the total of the thickness of a1 and that of a2) being 1.0 times or more of the screw diameter.

Kneading Segment ($\beta$)

The kneading segment ($\beta$) preferably used in the first invention of the application has, in the viewpoint of achieving the effective kneading by interrupting the mass to be kneaded that is tending downstream and retaining at the portion of the kneading segment ($\alpha$), a value of less than 1/60 which value is a ratio of the clearance between the vertex portion (here, the vertex portion means a point or portion at the farthest distance from the center of gravity in the cross-section) and the cylinder inner wall of the extruder to the screw diameter.

In the first invention of the application, in the point of performing effective kneading, the kneading segments ($\alpha$) and ($\beta$) are preferably adjacently disposed.

The kneading segment ($\beta$) is preferably one that has the same features (hereunder described) as those of the kneading segment (B) used in the second invention of the application:

B1) the kneading segment having two vertex portions (a) in the cross-section (here, the vertex portion means a point or portion at the farthest distance from the center of gravity in the cross-section), and B2) the vertex portion of the kneading segment having a structure twisted discontinuously to the thickness direction.

Kneading Segment (A) <FIG. 1>

The kneading segment (A) used in the second invention of the present application has three vertex portions (a) in the cross-sectional shape. Here, the vertex portion means a point or portion at the farthest distance from the center of gravity in the cross-section. Further, the kneading segment (A) is composed of a portion (a1) in which the vertex portion is continuously twisted to the thickness direction to the contrary direction relative to the screw rotary direction and a portion (a2) in which continuously twisted to the same direction relative to the rotary direction. Moreover, the thickness of kneading segment (the total of thickness of a1 and that of a2) is 1.0 times or more of the screw diameter, preferably 2.0 times or more.

In the viewpoint of optimizing the kneading conditions and the reaction rate of the dynamic crosslinking, the clearance between the vertex portion and the cylinder inner wall is preferably 1/100 or more, more preferably 1/60 or more, particularly preferably 2/100 or more of the screw diameter, and preferably 1/6 or less, more preferably 1/10 or less, particularly preferably 7/100 or less of the screw diameter. For example, the above clearance is preferably 1/100 or more to 1/6 or less of the screw diameter, more preferably 1/100 or more to 1/10 or less, or 1/60 or more to 1/6 or less, particularly preferably 2/100 or more to 7/100 or less.

Figure 2:
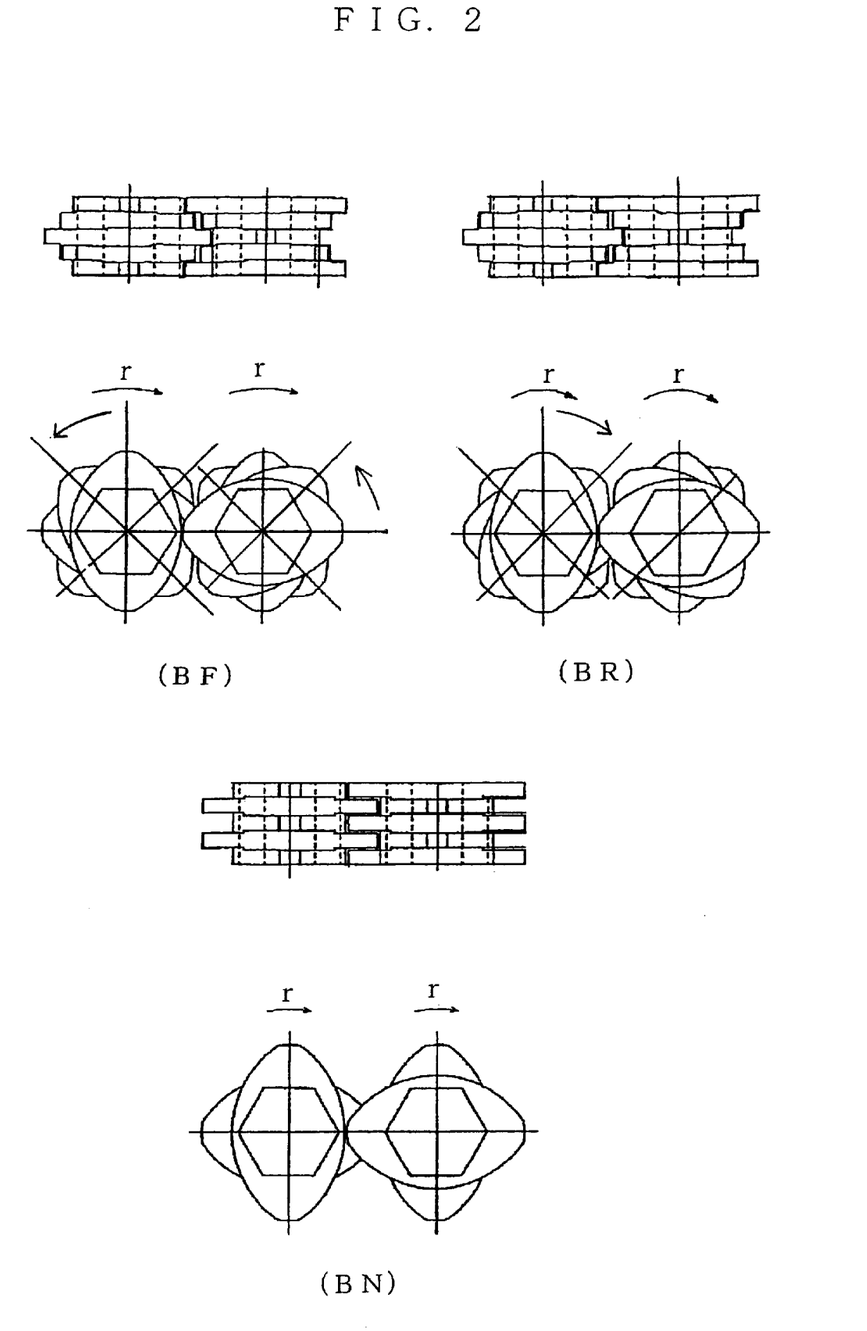
In FIG. 2, (BF) is a schematic illustration of the feeding (forward feeding) kneading segment, (BR) is that of the returning (backward feeding) kneading segment, and (BN) is that of the neutral (orthogonal) kneading segment. The direction of the resin flow is from this side of the paper to the opposite side.

Kneading Segment (B) <FIG. 2>

The kneading segment (B) favorably used in the second invention of the application is a so-called double-thread type kneading disc and has two vertex portions (b) in the cross-sectional shape. Here, the vertex portion means a point or portion at the farthest distance from the center of gravity in the cross-section. Further, the segment is usually composed of plural discs and has a structure wherein the vertex portions adjacent each other are discontinuously twisted to the thickness direction. The direction of the twist can be the same or different relative to the rotary direction. When the discs that are adjacent together are twisted less than 90° to the contrary direction relative to the rotary direction in the direction of from the upstream side to the downstream side, they are sometimes called a feeding (forward feeding) kneading segment (BF), when twisted less than 90° to the same direction, a returning (backward feeding) kneading segment (BR), and when twisted 90°, a neutral (orthogonal) kneading segment (BN).

In the second invention of the application, in the viewpoint of carrying out effective kneading, the kneading segment (A) and kneading segment (B) are each preferably disposed at one or more places of the screw, more preferably disposed at two or more places. At that time, in the point of performing more effective kneading, it is preferable to dispose the kneading segment (B) at the downstream side of the kneading segment (A) without other mediate segment between them. In such a case, it is preferable to improve the kneading efficiency by disposing the returning kneading segment (BR) or neutral kneading segment (BN) to the downstream of the kneading segment (A) and thereby increasing the material to be kneaded that stays at the portion of the kneading segment (A).

By the dynamic crosslinking using a twin screw extruder which has screws disposed with the kneading segments, an olefinic thermoplastic elastomer composition comprising the polyolefin resin and crosslinked rubber is obtained.

The third invention of the application can provide an olefinic thermoplastic elastomer composition which has an average number of fish eyes of 10 or less, by conducting the dynamic crosslinking, at the time of producing an olefinic thermoplastic elastomer composition comprising the polyolefin resin and crosslinked rubber through dynamic crosslinking with a twin screw extruder, under the conditions satisfying the following expression:

$$Z/X^{2.3} \geq 0.01$$

wherein Z is a throughput (kg/h) of the twin screw extruder at a steady-state and X is a diameter (mm) of the screw of the extruder.

Here, "steady-state" means a state in which the various conditions of the extruder have substantially become stable and a substantially homogeneous thermoplastic elastomer composition is being obtained.

The third invention of the present application is preferably combined with the first or the second invention of the present application.

More specifically, in the third invention of the application, it is preferable to use a twin screw extruder having the kneading segment (α) or kneading segment (A) as mentioned above in the first or the second invention of the application. Particularly, the maximum shearing velocity Y ($sec^{-1}$) generated at the part of the kneading segment (α) or kneading segment (A) is preferably 10 to 10,000 $sec^{-1}$, more preferably 100 to 2,000 $sec^{-1}$, furthermore preferably 200 to 1,000 $sec^{-1}$.

In the present invention, the rubber in an olefinic thermoplastic elastomer composition has been crosslinked means the case where the gel content measured by the following method is preferably in the range of 20 wt. % or more, more preferably 45 wt. % or more.

Measurement of Gel Content

A thermoplastic elastomer composition sample 100 mg is taken, cut into small pieces of 0. 5 mm×0. 5 mm×0. 5 mm, immersed in 30 ml cyclohexane in a closed container at 23° C. for 48 hours, then taken out on a filter paper and dried at room temperature for 72 hours or more until a constant weight is obtained. From the weight of the residue after drying there are subtracted the weights of all the cyclohexane insoluble components (fibrous filler, filler, pigment, etc.) other than the polymer component and the weight of the polyolefin resin in the sample before cyclohexane immersion. The value obtained thus is named "corrected final weight (Y)".

On the other hand, the weight of the rubber in the sample is named "corrected initial weight (X)".

The gel content is obtained by the following equation. Gel content [wt. %]=[corrected final weight (Y)/corrected initial weight (X)]×100.

According to the present invention, an olefinic thermoplastic elastomer composition excellent in tensile properties and molding appearance can be manufactured with good productivity. Since the olefinic thermoplastic elastomer composition produced in accordance with the invention has the above excellent characteristics, it can be used suitably for the interior skin materials of an automobile such as an instrumental panel, door, ceiling and seat; the exterior parts of an automobile such as bumper, mud guard, side molding, window molding and roof molding; various sealing parts of an automobile such as glass-run channel and weather strip; various gaskets and sealing parts in the field of earthwork and construction; and other daily needs.

This specification includes part or all of the contents as disclosed in the specification of Japanese patent application no. 2000-350873, which is the base of the priority claim of the present application.

BRIEF DESCRIPTION OF THE DRAWINGS

In FIG. 1, (1-A) is a transverse sectional view of the kneading segment (A) of the twin screw extruder, and (1-B) is a vertical sectional view of the kneading segment (A) of the same.

The meaning of each mark used in FIGS. 1 to 4 is as follows.

r: rotary direction of screw
s: direction of resin flow
c: clearance
a1: portion twisted continuously to contrary direction relative to rotary direction of screw
a2: portion twisted continuously to same direction relative to rotary direction of screw
1: first feeding port
2: second feeding port
3: vent port
F: feeding (forward feeding) kneading segment
R: returning (backward feeding) kneading segment
N: neutral (orthogonal) kneading segment
4: press sheet
5: glass
6: fluorescent light

DETAILED DESCRIPTION OF THE PREFERRED EMBODIMENTS

The present invention is explained hereunder by way of examples, by which, however, the present invention is not limited.

The measuring methods of physical properties which were carried out on olefinic thermoplastic elastomer compositions of Examples and Comparative examples were as follows.

Measuring Method of Physical Properties (1) Tensile strength: Tensile strength at break was measured according to JIS K6301 using a tensile speed of 200 mm/min.

(2) Tensile elongation: Tensile elongation at break was measured according to JIS K6301 using a tensile speed of 200 mm/min.

(3) Number of gel particles: A sheet press-formed at 190° C. (100×100×0.5 mm size) was placed on a glass and checked carefully with light shed from below with a scaled loupe about how many gel particles are present which are 0.3×0.1 mm or larger.

Figure 4:
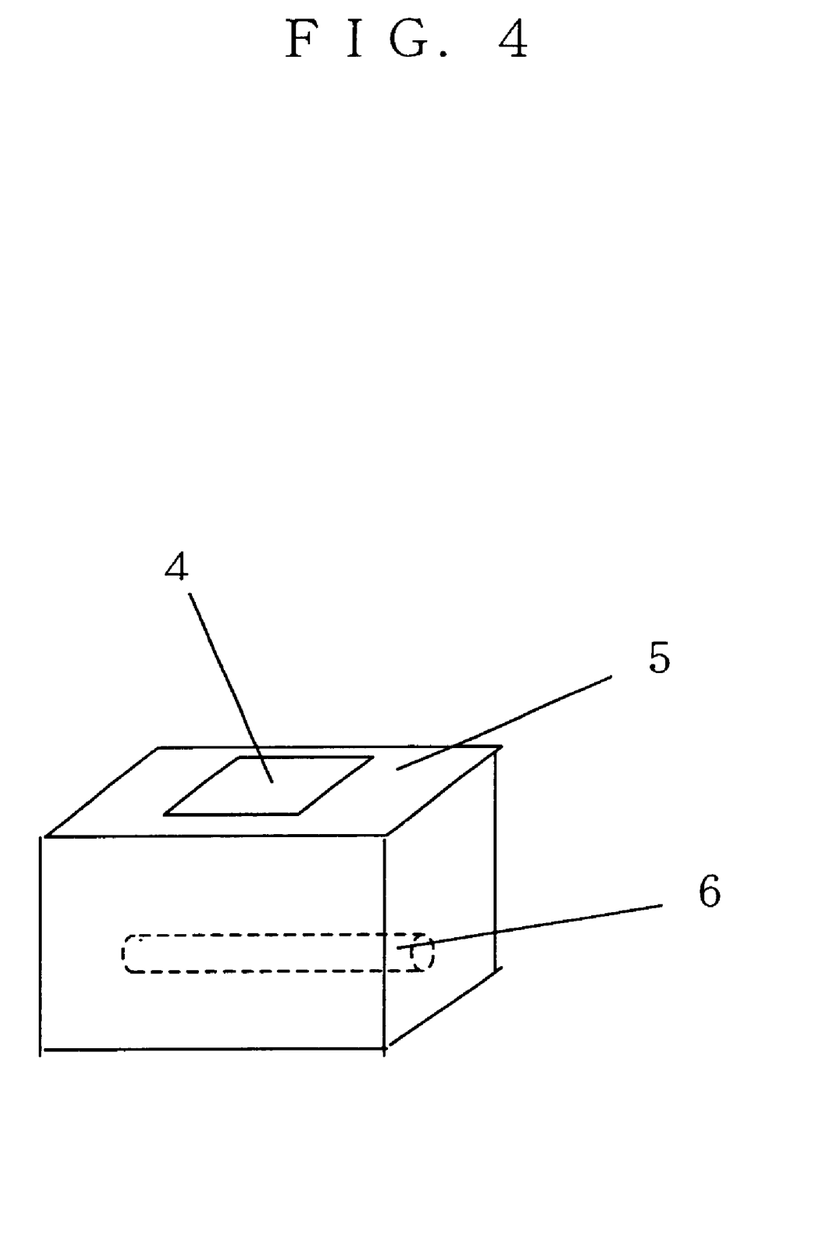
FIG. 4 is a drawing for explaining the measuring method of fish eyes.

(4) Measurement of fish eyes: A press sheet sized in 100×100×0.5 mm was prepared, placed on a glass of the box shown in FIG. 4, and searched for fish eyes in the press sheet which were 0.3×0.1 mm or larger with a scaled loupe with light of fluorescent light being shed from below. The number of fish eyes was counted. The average number of fish eyes was determined on five samples taken every hour after one hour's lapse from the time when the steady-state had been reached, and they are shown in Table 1. (The average numbers were rounded to the nearest whole numbers.)

EXAMPLE 1

Figure 3:
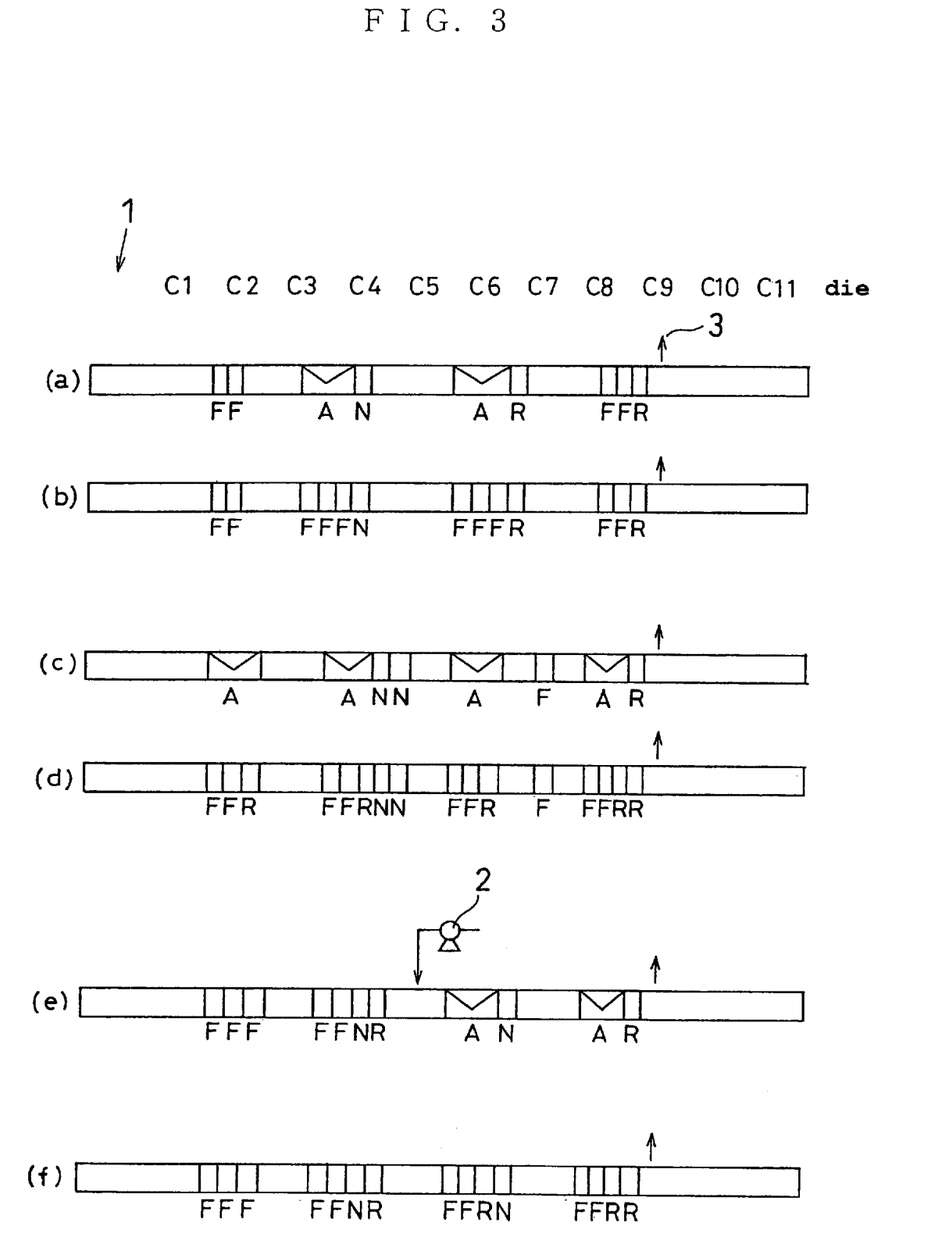
FIG. 3 illustrates the screw arrangements used in the Examples and in the Comparative examples. The drawing (a) shows a screw arrangement used in Example 1; (b), Comparative example 1; (c), Example 2 and Comparative example 5; (d), Comparative example 2; (e), Example 3 and Comparative example 4; and (f), Comparative example 3.

75 parts by weight of pellets of ethylene-propylene-5-ethylidene-2-norbornene copolymer rubber (R-1; Mooney viscosity $ML_{1+4}$ (100° C.) 94, ethylene/propylene molar ratio 78/22, iodine value 13), 25 parts by weight of pellets of propylene homopolymer 1 (MFR (ASTM D1238-65T, 230° C., load 2.16 kg) 11 g/10 min., density 0.91 g/cm$^3$), 0.2 part by weight of 2,5-dimethyl-2,5-di- (tert-butylperoxy) hexane and 0.3 part by weight of divinylbenzene were thoroughly stirred and blended in a Henschel mixer, charged into a hopper of a twin screw extruder fitted with the screw shown in FIG. 3(a), and subjected to dynamic crosslinking under the following conditions to manufacture pellets of a thermoplastic elastomer.

Extruder: complete engaged type twin screw extruder (same rotary direction)

Screw diameter: 46 mm

Thickness of kneading segment (total of thickness of a1 and that of a2): 108 mm

L/D: 44

Temperature setting: C1/C2/C3/C4/C5/C6/C7/C8/C9/C10/C11/D=120/120/140/140/160/180/200/220/220/220/220/200 (° C.)

Number of revolution: 400 rpm

Extrusion throughput: 100 kg/h

The obtained pellets were press formed into a sheet at 190° C., which was punched into specimens having a predetermined shape, and the physical properties were measured. The results are shown in Table 1.

COMPARATIVE EXAMPLE 1

From the same raw materials and composition as in Example 1, pellets of a thermoplastic elastomer were produced using the same extruder as in Example 1 except for using the screw shown in FIG. 3(b). The physical properties were measured in the same manner as Example 1. The results are shown in Table 1.

EXAMPLE 2

Pellets 60 parts by weight of oil-extended ethylene-propylene-dicyclopentadiene copolymer rubber [R-2; Mooney viscosity $ML_{1+4}$ (100° C.) 70, ethylene/propylene molar ratio 79/21, iodine value 13, oil amount 40 parts by weight (paraffinic process oil made by Idemitsu Kosan Co., trade name: Diana Process PW-380)], pellets 25 parts by weight of propylene-ethylene block copolymer (MFR (ASTM D1238-65T, 230° C., load 2.16 kg) 15 g/10 min., density 0.91 g/cm$^3$, n-decane extraction amount 8.2% by weight), pellets 15 parts by weight of ethylene-1-hexene random copolymer (MFR (ASTM D1238-65T, 190° C.) 18 g/10 min., density 0.92 g/cm$^3$, ethylene content 97 mol %), 0.2 part by weight of 2,5-dimethyl-2,5-di-(tert-butylperoxy) hexane and 0.3 part by weight of divinylbenzene were fully stirred and blended in a Henschel mixer; charged into a hopper of a twin screw extruder equipped with the screw shown in FIG. 3(c), and subjected to dynamic crosslinking under the following conditions to manufacture pellets of a thermoplastic elastomer.

Extruder: complete engaged type twin screw extruder (same rotary direction)

Screw diameter: 46 mm

Thickness of kneading segment (total of thickness of a1 and that of a2): 108 mm

L/D: 44

Temperature setting: C1/C2/C3/C4/C5/C6/C7/C8/C9/C10/C11/D=120/120/140/140/160/160/180/220/220/220/220/200 (° C.)

Number of revolution: 450 rpm

Extrusion throughput: 90 kg/h

Using the obtained pellets, measurement of physical properties was conducted in the same way as Example 1. The results are shown in Table 1.

COMPARATIVE EXAMPLE 2

From the same raw materials and composition as in Example 2, pellets of a thermoplastic elastomer were produced using the same extruder as in Example 2 except for using the screw shown in FIG. 3(d). The physical properties were measured in the same manner as Example 1. The results are shown in Table 1.

EXAMPLE 3

Pellets 70 parts by weight of an oil-extended product of ethylene-propylene-5-ethylidene-2-norbornene copolymer rubber [R-3; Mooney viscosity $ML_{1+4}$ (100° C.) 70, ethylene/propylene molar ratio 80/20, iodine value 11, oil amount 40 parts by weight (paraffinic process oil made by Idemitsu Kosan Co., trade name: Diana Process PW-380)], pellets 30 parts by weight of propylene homopolymer 2 (MFR (ASTM D1238-65T, 230° C., load 2.16 kg) 2 g/10 min., density 0.91 g/cm$^3$) and 0.2 part by weight of N,N'-m-phenylenebismaleimide were fully stirred and blended in a Henschel mixer, charged into a hopper of a twin screw extruder equipped with the screw shown in FIG. 3(e) and fed at 120 kg/h to the first feeding port of the extruder. 2,5-Dimethyl-2,5-di-(tert-butylperoxy)hexane diluted to 30% by weight with a softening agent (paraffinic process oil made by Idemitsu Kosan Co., trade name: Diana Process PW-380) was fed to the second feeding port at 240 g/h, and the mixture was subjected to dynamic crosslinking under the following conditions to prepare pellets of a thermoplastic elastomer.

Extruder: complete engaged type twin screw extruder (same rotary direction)

Screw diameter: 46 mm

Thickness of kneading segment (total of thickness of a1 and that of a2): 108 mm

L/D: 44

Temperature setting: C1/C2/C3/C4/C5/C6/C7/C8/C9/C10/C11/D=120/120/140/140/160/160/180/220/220/220/220/200 (° C.)

Number of revolution: 350 rpm

Extrusion throughput: 120 kg/h

Using the obtained pellets, measurement of physical properties was conducted in the same way as Example 1. The results are shown in Table 1.

COMPARATIVE EXAMPLE 3

Method Described in JP-A-9-095540

From the same raw materials and composition as in Example 3, pellets of a thermoplastic elastomer were produced using the same extruder as in Example 3 except for using the screw shown in FIG. 3(f). The physical properties were measured in the same manner as Example 1. The results are shown in Table 1.

COMPARATIVE EXAMPLE 4

From the same raw materials and composition as in Example 3, pellets of a thermoplastic elastomer were produced using the same extruder as in Example 3 provided that the operation conditions of the extruder were as shown in Table 1. The physical properties were measured in the same manner as Example 1. The results are shown in Table 1. (Screw revolution: 150 rpm).

COMPARATIVE EXAMPLE 5

From the same raw materials and composition as in Example 2, pellets of a thermoplastic elastomer were produced using the same extruder as in Example 2 provided that the operation conditions of the extruder were as shown in Table 1. The physical properties were measured in the same manner as Example 1. The results are shown in Table 1. (Screw revolution: 540 rpm).

portion in extruder, (sec$^{-1}$)
Z: throughput of extruder, (kg/h)
U: distance at narrowest portion of clearance between barrel inner wall and screw kneading segment, (mm)

$$2.2 \log X + \log Y - \log Z + (T-180) \div 100 \quad \text{Expression (1)}$$

$$Z/X^{2.3} \quad \text{Expression (2)}$$

All the publications, patents and patent applications cited herein are incorporated herein by reference in their entirety.

What is claimed is:

1. A method for manufacturing an olefinic thermoplastic elastomer composition characterized in that, in manufacturing an olefinic thermoplastic elastomer composition comprising a polyolefin resin and a crosslinked rubber by dynamic crosslinking with a twin screw extruder, there is used a screw whereto at least one kneading segment (α) is disposed, and the clearance between the vertex portion of said kneading segment (α) (here, the vertex portion means a point or portion at the farthest distance from the center of gravity in the cross-section) and the cylinder inner wall of the extruder is 1/60 or more to 1/6 or less of the screw diameter.

2. A manufacturing method according to claim 1, wherein a kneading segment (β) is disposed downstream the knead-

TABLE 1

|  | Example | | | Comparative Example | | | | |
| --- | --- | --- | --- | --- | --- | --- | --- | --- |
|  | 1 | 2 | 3 | 1 | 2 | 3 | 4 | 5 |
| Components (parts by weight) | | | | | | | | |
| Copolymer rubber | | | | | | | | |
| (R-1) | 75 | | | 75 | | | | |
| (R-2) | | 60 | | | 60 | | | 60 |
| (R-3) | | | 70 | | | 70 | 70 | |
| Propylene homopolymer 1 | 25 | | | 25 | | | | |
| Propylene homopolymer 2 | | | 30 | | | 30 | 30 | |
| Propylene-ethylene block copolymer | | 25 | | | 25 | | | 25 |
| Ethylene-1-hexene random copolymer | | 15 | | | 15 | | | 15 |
| Organic peroxide | 0.2 | 0.2 | 0.06 | 0.2 | 0.2 | 0.06 | 0.06 | 0.2 |
| Divinylbenzene | 0.3 | 0.3 | | 0.3 | 0.3 | | | 0.3 |
| N,N'-m-phenylenebismaleimide | | | 0.2 | | | 0.2 | 0.2 | |
| Softening agent (PW-380) | | | 0.14 | | | 0.14 | 0.14 | |
| Conditions of twin screw extruder | | | | | | | | |
| Screw arrangement | FIG. 3(a) | FIG. 3(c) | FIG. 3(e) | FIG. 3(b) | FIG. 3(d) | FIG. 3(f) | FIG. 3(e) | FIG. 3(c) |
| X (mm) | 46 | 46 | 46 | 46 | 46 | 46 | 46 | 46 |
| Y (sec$^{-1}$) | 380 | 570 | 270 | 380 | 570 | 270 | 120 | 680 |
| Z (kg/h) | 100 | 90 | 120 | 100 | 90 | 120 | 120 | 30 |
| T (° C.) | 265 | 281 | 253 | 273 | 288 | 260 | 238 | 302 |
| U (mm) | 2.5 | 1.9 | 3.1 | 2.5 | 1.9 | 3.1 | 3.1 | 1.9 |
| Value of expression (1) | 5.1 | 5.5 | 4.7 | 5.2 | 5.5 | 4.8 | 4.2 | 6.2 |
| Value of expression (2) | 0.015 | 0.013 | 0.018 | 0.015 | 0.013 | 0.018 | 0.018 | 0.004 |
| Physical properties of moldings | | | | | | | | |
| Tensile strength (MPa) | 8.5 | 15.6 | 9.4 | 7.2 | 11.3 | 8.1 | 7.9 | 8.0 |
| Tensile elongation at break (%) | 680 | 700 | 590 | 540 | 530 | 480 | 480 | 390 |
| Gel content (%) | 95 | — | 90 | 95 | — | 90 | 89 | — |
| Number of gel particles | 2 | 3 | 0 | 15 | 26 | 12 | 5 | 1 |
| Average number of fish eyes | 2 | 3 | 0 | 15 | 26 | 12 | 5 | 1 |

Organic peroxide:
2,5-dimethyl-2,5-di-(tert-butylperoxy)hexane
Softening agent: paraffinic process oil made by Idemitsu Kosan Co., trade name: Diana Process PW-380
T: resin temperature at die outlet of twin screw extruder, (° C.)
X: screw diameter of extruder, (mm)
X: maximum shearing velocity generated at kneading segment (A)

ing segment (α) which segment (β) has a ratio of the clearance between the vertex portion of the kneading segment (here, the vertex portion means a point or portion at the farthest distance from the center of gravity in the cross-section) and the cylinder inner wall of the extruder to the screw diameter which ratio is smaller than said ratio concerning said kneading segment (α).

3. A manufacturing method according to claim 2, wherein the kneading segment (α) and the kneading segment (β) are disposed adjacently.

4. A manufacturing method according to claim 1, wherein the clearance between the vertex portion of the kneading segment (α) (here, the vertex portion means a point or portion at the farthest distance from the center of gravity in the cross-section) and the cylinder inner wall of the extruder is 1/60 or more to 1/10 or less of the screw diameter.

5. A manufacturing method according to claim 2, wherein the value is less than 1/60 which value is a ratio of the clearance between the vertex portion of the kneading segment (β) (here, the vertex portion means a point or portion at the farthest distance from the center of gravity in the cross-section) and the cylinder inner wall of the extruder to the screw diameter.

6. A manufacturing method according to claim 1, wherein the kneading segment (α) has the following features:
- A1) the kneading segment having three vertex portions (a) in the cross-section (here, the vertex portion means a point or portion at the farthest distance from the center of gravity in the cross-section),
- A2) the vertex portion of the kneading segment being composed of a portion (a1) continuously twisted to the contrary direction relative to the screw rotary direction and a portion (a2) continuously twisted to the same direction relative to the screw rotary direction, respectively to the thickness direction, and A3) the thickness of the kneading segment (the total of the thickness of a1 and that of a2) being 1.0 times or more of the screw diameter.

7. A method for manufacturing an olefinic thermoplastic elastomer composition characterized in that, in manufacturing an olefinic thermoplastic elastomer composition comprising a polyolefin resin and a crosslinked rubber by dynamic crosslinking with a twin screw extruder, a kneading segment (A) is disposed at least at one place of the screw which segment (A) has the following features:
- A1) the kneading segment having three vertex portions (a) in the cross-section (here, the vertex portion means a point or portion at the farthest distance from the center of gravity in the cross-section),
- A2) the vertex portion of the kneading segment being composed of a portion (a1) continuously twisted to the contrary direction relative to the screw rotary direction and a portion (a2) continuously twisted to the same direction relative to the screw rotary direction, respectively to the thickness direction, and A3) the thickness of the kneading segment (the total of the thickness of a1 and that of a2) being 1.0 times or more of the screw diameter.

8. A manufacturing method according to claim 7, wherein there is used a screw disposed with said kneading segment (A) at least at one place and disposed with a kneading segment (B) at least at one place having the following features:
- B1) the kneading segment having two vertex portions (b) in the cross-section (here, the vertex portion means a point or portion at the farthest distance from the center of gravity in the cross-section), and
- B2) the vertex portion of the kneading segment having a structure twisted discontinuously to the thickness direction.

9. A manufacturing method according to claim 8, wherein there is used a screw that has a structure disposed with the kneading segment (B) on the downstream side of the kneading segment (A) with no other segment between.

10. A manufacturing method according to claim 9, wherein there is used a screw that is disposed with a combination of the kneading segments (A) and (B) at least at two places, in which combination the kneading segment (B) is disposed on the downstream side of the kneading segment (A) with no other segment between.

11. A manufacturing method according to claim 7, wherein the clearance between the vertex portion of the kneading segment (A) and the inner wall of the extruder cylinder is 1/100 or more to 1/6 or less of the screw diameter.

12. A manufacturing method according to claim 8, wherein the value is less than 1/60 which value is a ratio of the clearance between the vertex portion of the kneading segment (B) (here, the vertex portion means a point or portion at the farthest distance from the center of gravity in the cross-section) and the inner wall of the extruder cylinder to the screw diameter.

13. A manufacturing method according to claim 1, wherein said twin screw extruder has one or more upstream barrels and one or more downstream barrels, and wherein at least one of the upstream barrel of the twin screw extruder is set to a temperature of 170° C. or lower and at least one of the downstream barrel is set to a temperature of 190° C. or higher.

14. A manufacturing method according to claim 7, wherein at least one of the upstream barrel of the twin screw extruder is set to a temperature of 170° C. or lower and at least one of the downstream barrel is set to a temperature of 190° C. or higher.

15. A manufacturing method according to claim 1, wherein the dynamic crosslinking is conducted under the conditions satisfying the following expression:

$$4.5 < 2.2 \log X + \log Y - \log Z + (T-180) \div 100 < 6.0$$

wherein T is a resin temperature (° C.) at the die outlet of the twin screw extruder, X is a screw diameter (mm) of the extruder, Y is a maximum shearing velocity ($sec^{-1}$) generated at the part of the kneading segment (A) in the extruder and Z is an extrusion throughput (kg/h) of the extruder, and said maximum shearing velocity Y ($sec^{-1}$) is determined from the equation $$Y = (X \times \pi \times S)/U$$

wherein X is a screw diameter (mm) of the twin screw extruder, S is a number of screw revolution per second (rps) and U is a distance (mm) of the narrowest portion of the clearance between the barrel inner wall and the kneading segment of the screw.

16. A manufacturing method according to claim 7, wherein the dynamic crosslinking is conducted under the conditions satisfying the following expression:

$$4.5 < 2.2 \log X + \log Y - \log Z + (T-180) \div 100 < 6.0$$

wherein T is a resin temperature (° C.) at the die outlet of the twin screw extruder, X is a screw diameter (mm) of the extruder, Y is a maximum shearing velocity ($sec^{-1}$) generated at the part of the kneading segment (A) in the extruder and Z is an extrusion throughput (kg/h) of the extruder, and said maximum shearing velocity Y ($sect^{-1}$) is determined from the equation $$Y = (X \times \pi \times S)/U$$

wherein X is a screw diameter (mm) of the twin screw extruder, S is a number of screw revolution per second (rps) and U is a distance (mm) of the narrowest portion of the clearance between the barrel inner wall and the kneading segment of the screw.

17. A method for manufacturing an olefinic thermoplastic elastomer composition characterized in that, in manufacturing an olefinic thermoplastic elastomer composition comprising a polyolefin resin and a crosslinked rubber by dynamic crosslinking with a twin screw extruder, the crosslinking is conducted under the conditions satisfying the following expression:

$$Z/X^{2.3} \geq 0.01$$

wherein Z is a throughput (kg/h) of the twin screw extruder at a steady-state and X is a screw diameter (mm) of the twin screw extruder, and besides the olefinic thermoplastic elastomer composition has an average number of fish eyes of 10 or less determined on at least three or more samples taken every one hour at a steady-state.

* * * * *